United States Patent
Pichler et al.

(10) Patent No.: US 11,411,492 B1
(45) Date of Patent: Aug. 9, 2022

(54) SELF LIMITING CHARGE PUMP

(71) Applicant: NXP B.V., Eindhoven (NL)

(72) Inventors: Thomas Pichler, Graz (AT); Ivan Jesus Rebollo Pimentel, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/303,485

(22) Filed: May 29, 2021

(51) Int. Cl.
*H02M 3/07* (2006.01)
*G06K 19/07* (2006.01)

(52) U.S. Cl.
CPC .......... *H02M 3/07* (2013.01); *G06K 19/0713* (2013.01)

(58) Field of Classification Search
CPC .............................. H02M 3/07; G06K 19/0713
See application file for complete search history.

(56) References Cited

U.S. PATENT DOCUMENTS

| | | | |
|---|---|---|---|
| 7,158,009 B2 | 1/2007 | Watanabe | |
| 7,259,612 B2 | 8/2007 | Saether | |
| 7,439,860 B2 | 10/2008 | Andresky | |
| 7,688,122 B2 | 3/2010 | Nedovic | |
| 7,795,966 B2 | 9/2010 | Wyse | |
| 7,944,279 B1 | 5/2011 | El Waffaoui | |
| 8,500,033 B2 | 8/2013 | Almond et al. | |
| 8,687,395 B2 * | 4/2014 | El Waffaoui | H02M 3/07 363/127 |
| 9,030,297 B2 | 5/2015 | Hill | |
| 9,471,816 B1 | 10/2016 | Hyde et al. | |
| 9,594,997 B1 | 3/2017 | Buescher | |
| 9,997,928 B2 | 6/2018 | Petersen et al. | |
| 10,211,825 B2 * | 2/2019 | Bellaouar | H01L 29/0653 |
| 10,587,110 B2 | 3/2020 | Malinowski | |
| 2004/0212503 A1 | 10/2004 | Stilp | |
| 2007/0257800 A1 | 11/2007 | Yang et al. | |
| 2010/0019907 A1 | 1/2010 | Shanks | |
| 2011/0115540 A1 | 5/2011 | Kamp | |
| 2015/0129666 A1 | 5/2015 | Butler et al. | |
| 2015/0227832 A1 | 8/2015 | Diorio et al. | |

(Continued)

FOREIGN PATENT DOCUMENTS

| CN | 104052415 A | 9/2014 |
|---|---|---|
| EP | 2487993 A2 | 8/2012 |

OTHER PUBLICATIONS

Non-Final Office Action for U.S. Appl. No. 17/303,487; dated Dec. 30, 2021; 14 Pages.

(Continued)

*Primary Examiner* — Sibin Chen

(57) ABSTRACT

A charge pump for a Radio Frequency Identification (RFID) tag is disclosed. The charge pump includes an antenna port to receive an input AC signal, an input port to receive an input signal, and a main transistor having a gate, a source and a drain. A threshold voltage cancellation circuit is included and is coupled between one terminal of the antenna port and the input port, wherein an output of the threshold voltage cancellation circuit is configured to drive the gate of the main transistor. The threshold voltage cancellation circuit is configured to reduce the threshold voltage of the main transistor when the voltage of the input signal is below a predefined voltage level and to remove threshold voltage cancellation when the voltage of the input signal is above the predefined voltage levels.

14 Claims, 3 Drawing Sheets

(56) References Cited

U.S. PATENT DOCUMENTS

| | | | |
|---|---|---|---|
| 2016/0180123 A1 | 6/2016 | Forster | |
| 2017/0104408 A1 | 4/2017 | Rebollo et al. | |
| 2017/0324385 A1* | 11/2017 | McKay | H01L 21/67011 |
| 2018/0069433 A1* | 3/2018 | Lin | H02J 50/12 |
| 2018/0287508 A1* | 10/2018 | Nakamura | H02M 7/217 |

OTHER PUBLICATIONS

U.S. Appl. No. 17/247,650, filed Dec. 18, 2020, entitled: Dual System RFID Tag. The Examiner is referred to the copending patent prosecution of the common Applicant (no attachment).

U.S. Appl. No. 17/303,488, filed May 29, 2021, entitled: RFID Tag Self Tuning. The Examiner is referred to the copending patent prosecution of the common Applicant (no attachment).

U.S. Appl. No. 17/303,487, filed May 29, 2021, entitled: RFID Tag Limiter. The Examiner is referred to the copending patent prosecution of the common Applicant (no attachment).

Notice of Allowance dated Mar. 11, 2022 for U.S. Appl. No. 17/303,488; 22 Pages.

Final Office Action dated Jun. 9, 2022 for U.S. Appl. No. 17/303,487, 19 Pages.

* cited by examiner

SELF LIMITING CHARGE PUMP

BACKGROUND

Radio Frequency Identification (RFID) refers to a wireless system comprised of two components: tags and readers. The reader is a device that has one or more antennas that emit radio waves and receive signals back from the RFID tag. Tags, which use radio waves to communicate their identity and other information to nearby readers, can be passive or active. Passive RFID tags are powered by the reader and do not have a battery. Active RFID tags are powered by batteries. Near Field Communication (NFC) is a wireless communication technology that acts over short distances for two-way communication. The use of NFC tags is growing in several markets, including the medical, consumer, retail, industrial, automotive, and smart grid markets. NFC is a type of RFID technology. Due to internal or external factors such as distance from the other device or tag, nearby objects, etc. the tag needs to be tuned to balance the impedance to optimize the received signal strength before a data read cycle starts.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a charge pump for a Radio Frequency Identification (RFID) tag is disclosed. The charge pump includes an antenna port to receive an input AC signal, an input port to receive an input signal, and a main transistor having a gate, a source and a drain. A threshold voltage cancellation circuit is included and is coupled between one terminal of the antenna port and the input port, wherein an output of the threshold voltage cancellation circuit is configured to drive the gate of the main transistor. The threshold voltage cancellation circuit is configured to reduce the threshold voltage level of the main transistor when the voltage of the input signal is below a predefined voltage and to remove threshold voltage cancellation when the voltage of the input signal is above the predefined voltage level.

In some examples, the threshold voltage cancellation circuit includes a first transistor and a second transistor each having a first terminal, a second terminal and a gate and the first terminals of the first transistor and the second transistor are coupled with the one terminal of the antenna port. The gate of the first transistor is coupled with the second terminal of the second transistor. The gate of the second transistor is coupled with the input port. An overvoltage clamp may be included and may be coupled between the gate of the main transistor and the input port. The threshold voltage cancellation circuit is configured to disable the threshold voltage cancellation when the voltage of the input signal is above the predefined voltage level.

In another embodiment, a cascaded charge pump for a Radio Frequency Identification (RFID) tag comprising a plurality of charge pumps is disclosed. Each charge pump in the plurality of charge pumps includes an antenna port to receive an input AC signal, an input port to receive an input signal, and a main transistor having a gate, a source and a drain. A threshold voltage cancellation circuit is included and is coupled between one terminal of the antenna port and the input port, wherein an output of the threshold voltage cancellation circuit is configured to drive the gate of the main transistor. The threshold voltage cancellation circuit is configured to reduce the threshold voltage of the main transistor when the voltage of the input signal is below a predefined voltage level and to remove threshold voltage cancellation when the voltage of the input signal is above the predefined voltage level.

In some embodiments, at least one of the plurality of charge pumps is configured to have the removal of the threshold voltage cancellation disabled.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. Advantages of the subject matter claimed will become apparent to those skilled in the art upon reading this description in conjunction with the accompanying drawings, in which like reference numerals have been used to designate like elements, and in which:

Figure 1:
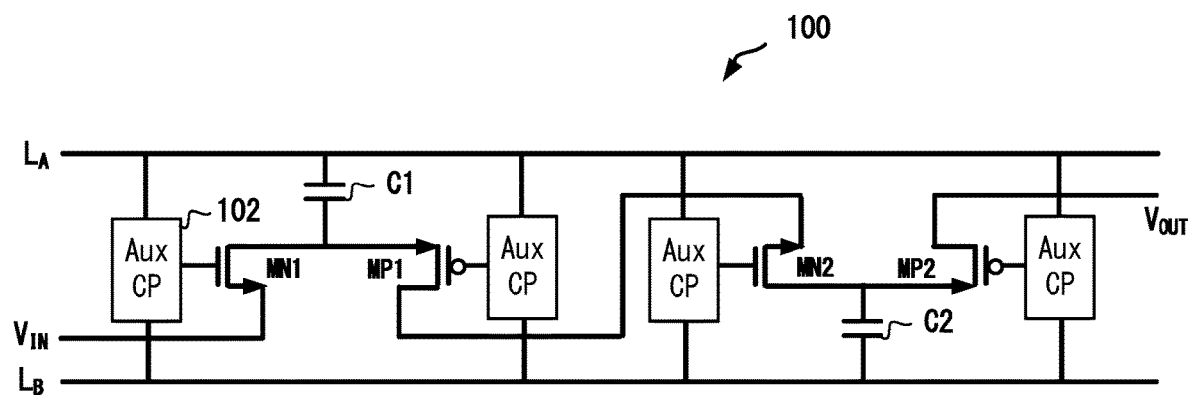
FIG. 1 shows a charge pump in accordance with one or more embodiments of the present disclosure.

Note that figures are not drawn to scale. Well known components of the depicted circuits may have been omitted because those components are known to a person skilled in the art.

DETAILED DESCRIPTION

Many well-known manufacturing steps, components, and connectors have been omitted or not described in details in the description so as not to obfuscate the present disclosure.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", "one example", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

RFID tags can store a range of information from one serial number to several pages of data. RFID tags can be mobile so that they can be carried by hand, or they can be mounted on a post or overhead. RFID systems can also be built into the architecture of a cabinet, room, or building. NFC is a technology based on RFID technology. NFC technology can be used to provide peer-to-peer communication or one way communication. When two NFC enabled devices are very close to each other, about 4 cm or less, they can communicate with each other using the radio waves. Of the two devices communicating using NFC, at least of them has to be an active device (powered). In many cases, this would be a smartphone, tablet, security pad, or a payment terminal. The other device can be either active or passive (unpowered). Using NFC, two devices can be set up in less than one-tenth of a second.

In an active peer-to-peer (P2P) mode, two active devices create a wireless communication channel between them. The active device, with an external power supply, can power the passive device with the electromagnetic field coming from the active device. U.S. Pat. No. 9,997,928 entitled "self-tuning resonant power transfer systems" by Petersen describes tuning a wireless power transfer system, which is incorporated herein by reference. U.S. Pat. No. 8,836,512 entitled "Self tuning RFID" by Shanks describes the self-tuning of RFID tag, which is incorporated herein by reference. The self-tuning of the RFID tag ensures optimal power transfer from the active device to the RFID tag so that the RFID tag can use the received energy to transfer data back to the active device. NFC passive devices are used in many applications because the passive NFC device can be a simple tag. NFC devices communicate with each other via radio waves. The active NFC device has to be enabled (turned on) first. The radio waves for NFC are generated using an antenna. NFC works by exploiting the properties of electromagnetic fields, using the inductive coupling between NFC devices. It operates at the 13.56 MHz frequency, which is a license-free section of HF on the RF spectrum.

The strength of the received signal may be dependent on the distance as well as external factors such as nearby objects, human touch, etc. Therefore, in some examples, RFID tags may include a switchable capacitor bank that includes a plurality of capacitors coupled with switches. The value of the capacitor may be changed by turning one or more of these switches on or off. The input impedance of the receiver antenna may be changed by changing the capacitor value to optimize the signal strength of the input signal. A charge pump is used in RFID tags to convert input voltage level to another voltage level. It is advantageous to use a self-limiting charge pump to limit an output voltage of the charge pump to a predefined voltage so that a limiter that is used in RFID tags does not need to dissipate the excess energy, hence to maintain the power level above a threshold to allow RFID tags to transmit back the data using the energy received from an external RFID reader.

Typically, charge pumps are designed to achieve the high efficiency and therefore maximize the output power for a wide range of input power. In some applications however, maximizing the output power for a wide range of input power may be unfavorable. For example, in self-tuning RFID tags, the charge pump needs to ensure a high efficiency and an increased output voltage at very low input power, to allow an efficient use of the self-tuning. After the tuning, if the output of the charge pump is above a threshold, more energy needs to be limited by a limiter in the RFID tag and this may lead degraded system performance. The charge pump described herein ensures a high charge pump efficiency for lower input power low efficiency at higher input power so that the output of the charge pump is limited to a predefined output voltage.

FIG. 1 shows a charge pump 100. The charge pump 100 may be included in an integrated circuit. The charge pump 100 includes input ports to receive signals $L_A$ and $L_B$ from an antenna and an input port to receive input signal $V_{IN}$. The charge pump 100 outputs an output signal $V_{OUT}$ that has a voltage level different from the input signal $V_{IN}$. An auxiliary charge pump 102 is used to boost the gate voltage or cancel the threshold voltage of MN1 and MP, because the voltage level received from $L_A$ and $L_B$ may not be sufficient to drive the transistors MN1 and MP1 due to their threshold voltages being higher than the applied gate voltage. A capacitor C1 is included and is coupled between $L_A$ and the terminals of the transistors MN1 and MP1. A similar circuit including transistors MN2 and MP2 and a capacitor C2 is included for a negative side of the input signal.

Figure 2:
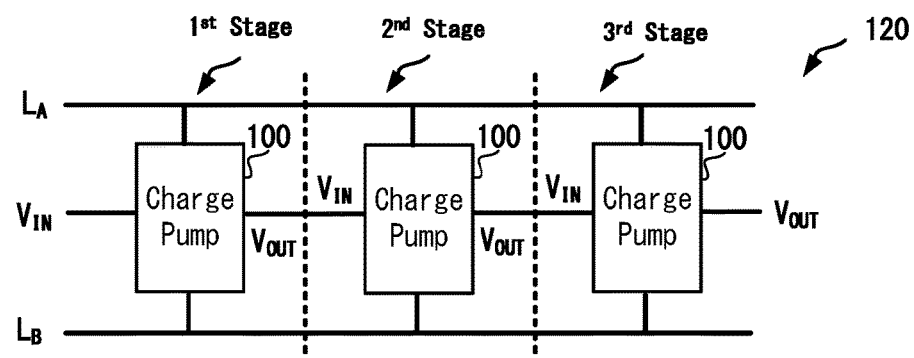
FIG. 2 depicts cascaded charged pump using the charge pump of FIG. 1 in accordance with one or more embodiments of the present disclosure.

FIG. 2 shows a cascaded charge pump 120 that includes three copies of the charge pump 100. Depending on the output voltage requirements, more or less number of stages may be used. The output of the first stage is inputted to the input of the second stage and so on. In some embodiments, instead of the charge pump 100 described herein, a typical charge pump may be used in at least one of the stages. For example, in some embodiments, the charge pump 100 in the 3rd stage is replaced by a typical charge pump. In some other embodiments, if the charge pump 100 includes the EN port, instead of using a typical charge pump, the charge pump 100 that is configured to stay disabled using a control signal at the EN port.

The auxiliary charge pump (aux. CP) 102 is a small charge pump that is used to cancel the threshold of the transistors MN1 and MP1 to lower the operating voltage of the charge pump 100. The aux. CP 102 applying a voltage offset on top of the input AC signal swing.

Figure 3:
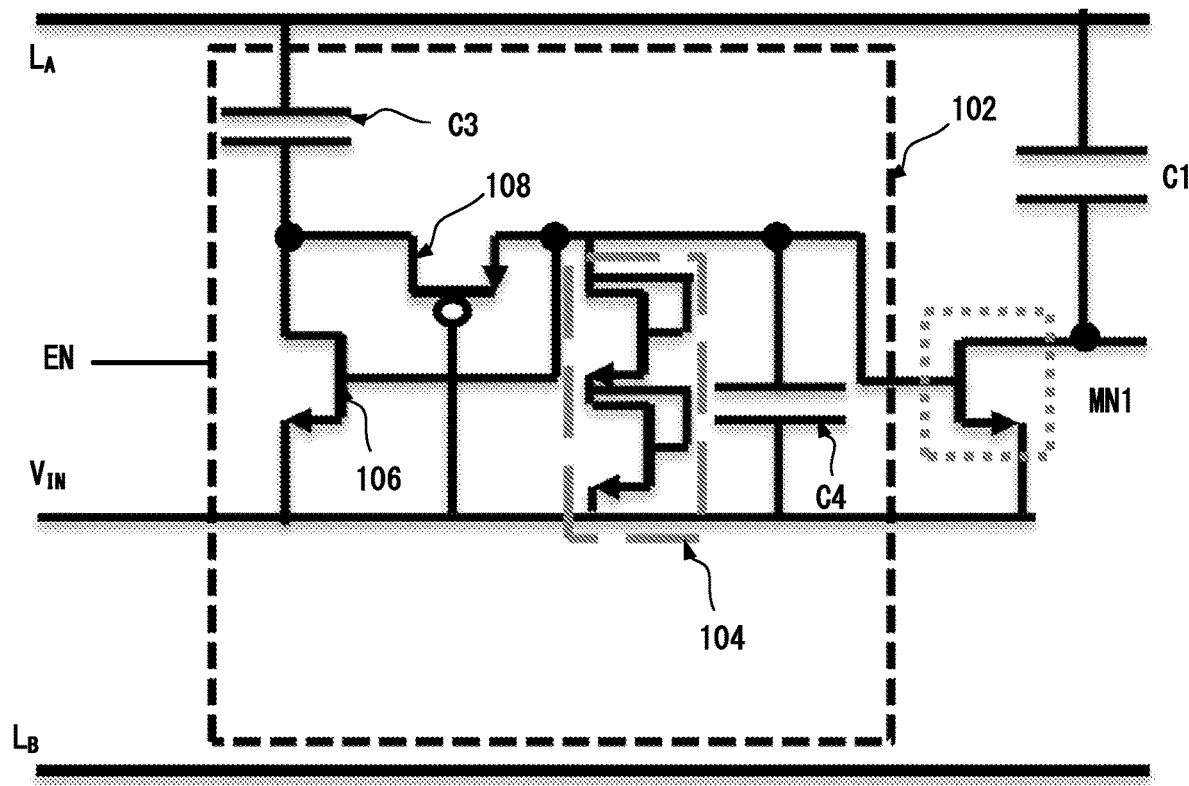
FIG. 3 an auxiliary charge pump to drive the charge pump of FIG. 1 in accordance with one or more embodiments of the present disclosure.

FIG. 3 shows a section of the charge pump 100 including a sample internal structure of the aux. CP 102. The aux. CP 102 may include a first transistor 106 which may be NMOS type and a second transistor 108 which may be PMOS type. A capacitor C3 is coupled between $L_A$ and the first transistor 106 and the second transistor 108. The gate of the second transistor 108 is driven by $V_{IN}$ signal. The first transistor 106 is coupled between the capacitor C3 and $V_{IN}$. The gate of the first transistor is coupled with the output line that drives the gate of the transistor MN1. In some examples, a overvoltage clamp 104 may be included. To cancel the threshold voltage ($V_{TH}$) of the transistor MN1 so that a lower voltage signal can drive the transistor MN1. In some examples, a static gate-source voltage is applied to the transistor MN1 to reduce the effective $V_{TH}$ of the transistor MN1. In some examples, the effective $V_{TH}$ may be controlled by tuning the clamping voltage of the overvoltage clamp 104, if present. Note that the overvoltage clamp 104 shown in FIG. 3 is for example only. The overvoltage clamp 4 may be implemented using other circuit configurations (known to a person skilled in the art) and components such as diodes, switches, etc. A capacitor C4 is coupled between the gate and the source of the transistor MN1. The capacitor C4 adds an offset to the gate voltage of the transistor MN1 at higher input voltage levels thus effectively stopping the $V_{TH}$ cancellation at higher voltage levels and thus reducing the charge pump efficiency at higher voltage levels. The stopping the $V_{TH}$ cancellation at higher voltages occurs when the transistor MN1 is overbiased at higher voltages thus making the VTH cancellation ineffective. The $V_{TH}$ cancellation technique described above may only be applied to some stages of the cascaded charge pump 120. In one example, the $V_{TH}$ cancellation may only be applied to the first stage of the cascaded charge pump 120. In some examples, the aux. CP 102 may include an enable (EN) port to enable or disable the cancellation of $V_{TH}$ at higher input voltage levels based on application requirements. In some embodiments, the enable signal may disconnect or connect the capacitor C4 from the circuit using a switch (not shown). In other examples, the EN port is not required as the charge pump 100 may be tuned by tuning the overvoltage clamp 104, varying the value of the capacitor C4 and based on the threshold voltage of the transistor MN1.

Figure 4:
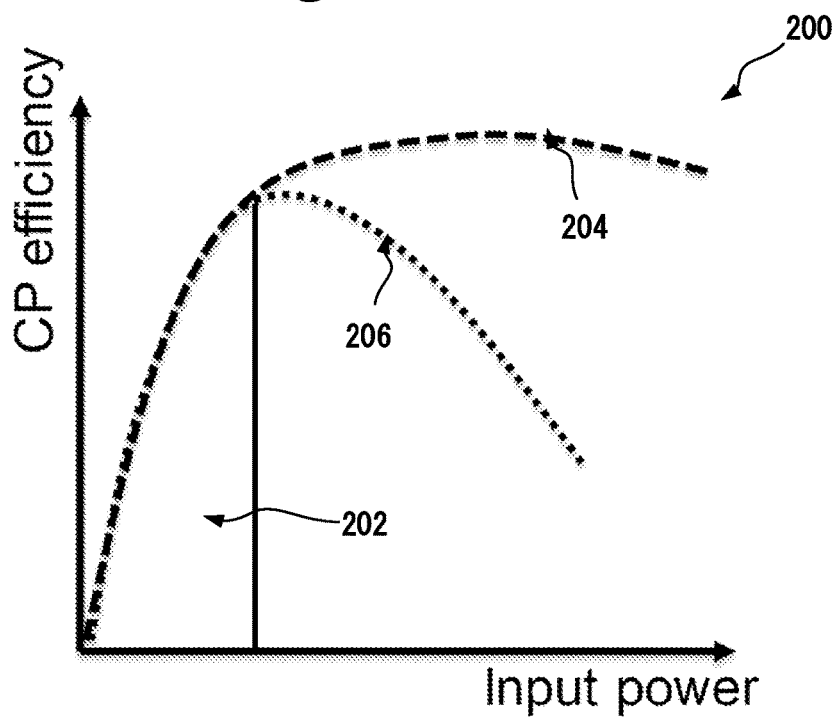
FIG. 4 shows a graph of charge pump efficiency versus input power in accordance with one or more embodiments.

FIG. 4 shows a graph 200 of charge pump efficiency versus input power. The section 202 shows the region of operation in which the charge pump 100 operate with a same or similar efficiency of a typical charge pump. At a configurable input power or input voltage threshold, the efficiency of the charge pump, as indicated by the curve 206 starts to fall sharply compared to the efficiency of a typical charge pump, as shown by the curve 204. This reduction in the efficiency of the charge pump 100 at higher power levels creates a self-limiting of the output of the charge pump 100.

Figure 5:
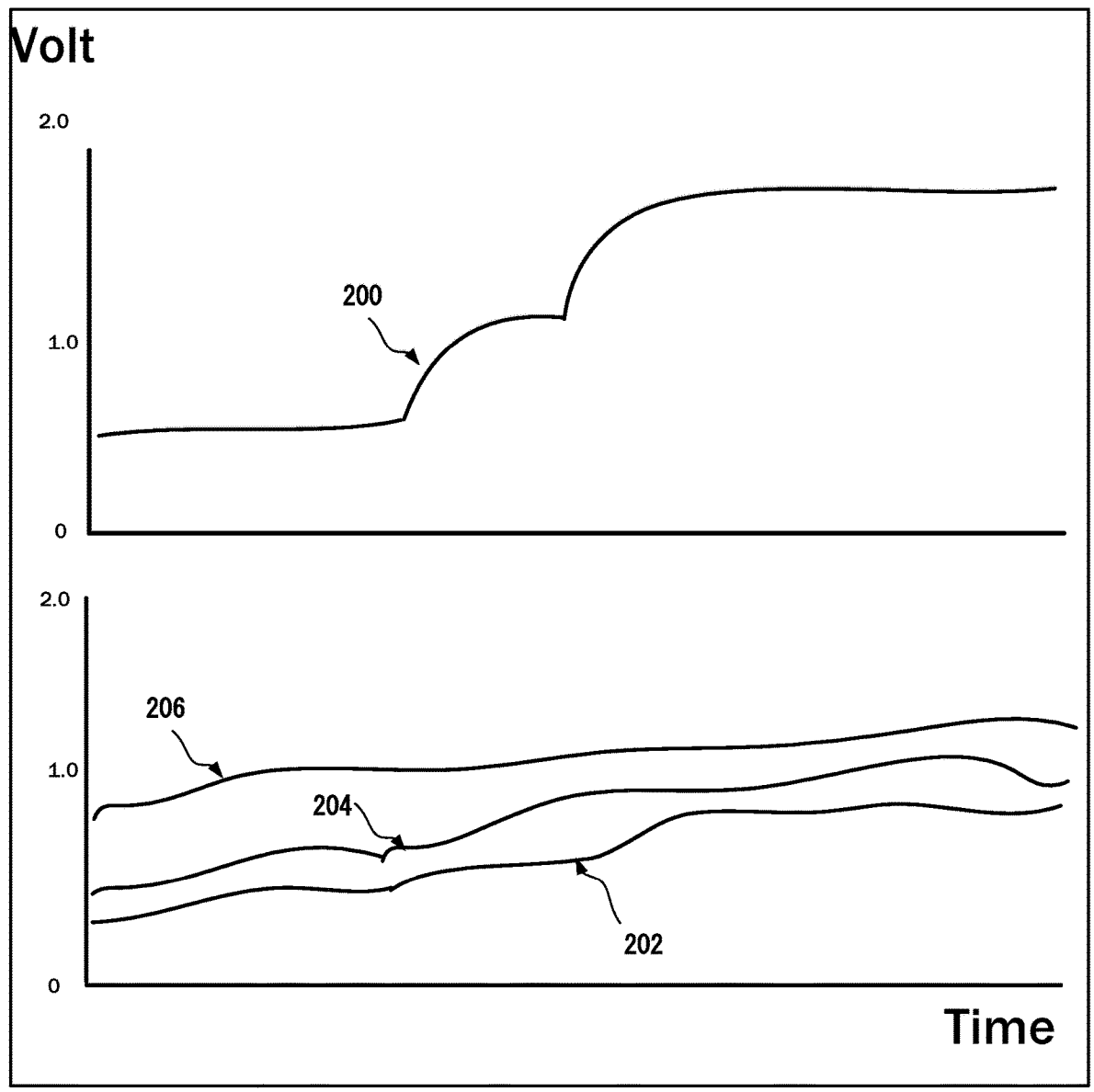
FIG. 5 shows an input and an output voltage graph in accordance with one or more embodiments.

FIG. 5 shows an input and an output voltage graph. The graph 200 shows input voltage that is shown to be increasing in steps corresponding the self-tuning steps. In this example, the self-tuning is being performed in three steps. The graphs 202, 204, 206 are the output curves of the first stage, the second stage and the third stage of the cascaded charge pump 120 respectively. As shown, the output curve 206 of the third stage does not increase as much as the third section (the highest voltage section) of the input voltage curve 200. As shown, at higher input voltages, the charge pump 100 limits the output. In some examples, at least one of the three stages shown may not include the charge pump 100, instead that stage may include a typical auxiliary charge pump that is not configured to provide the stopping of the $V_{TH}$ cancellation at higher input voltage levels.

Some or all of these embodiments may be combined, some may be omitted altogether, and additional process steps can be added while still achieving the products described herein. Thus, the subject matter described herein can be embodied in many different variations, and all such variations are contemplated to be within the scope of what is claimed.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A charge pump for a Radio Frequency Identification (RFID) tag, comprising:
   an antenna port to receive an input AC signal;
   an input port to receive an input signal;
   a main transistor having a gate, a source and a drain; and
   a threshold voltage cancellation circuit coupled between one terminal of the antenna port and the input port, wherein an output of the threshold voltage cancellation circuit is configured to drive the gate of the main transistor, wherein the threshold voltage cancellation circuit includes a first transistor and a second transistor each having a first terminal, a second terminal and a gate and the first terminals of the first transistor and the second transistor are coupled with the one terminal of the antenna port, and a capacitor is coupled between the gate of the main transistor and the input port, and wherein the threshold voltage cancellation circuit is configured to reduce a threshold voltage of the main transistor when a voltage of the input signal is below a predefined voltage and to remove threshold voltage cancellation when the voltage of the input signal is above the predefined voltage.

2. The charge pump of claim 1, wherein the gate of the first transistor is coupled with the second terminal of the second transistor.

3. The charge pump of claim 2, wherein the gate of the second transistor is coupled with the input port.

4. The charge pump of claim 1, further including an overvoltage clamp coupled between the gate of the main transistor and the input port.

5. The charge pump of claim 1, wherein the threshold voltage cancellation circuit includes an enable port to enable or disable removal of the threshold voltage cancellation when the voltage of the input signal is above the predefined voltage.

6. An integrated circuit including the charge pump of claim 1.

7. A cascaded charge pump for a Radio Frequency Identification (RFID) tag, comprising a plurality of charge pumps, each charge pump in the plurality of charge pumps includes:
   an antenna port to receive an input AC signal;
   an input port to receive an input signal;
   a main transistor having a gate, a source and a drain; and
   a threshold voltage cancellation circuit coupled between one terminal of the antenna port and the input port, wherein an output of the threshold voltage cancellation circuit is configured to drive the gate of the main transistor, wherein the threshold voltage cancellation circuit includes a first transistor and a second transistor each having a first terminal, a second terminal and a gate and the first terminals of the first transistor and the second transistor are coupled with the one terminal of the antenna port, and wherein the threshold voltage cancellation circuit is configured to reduce a threshold voltage of the main transistor when a voltage of the input signal is below a predefined voltage and to remove threshold voltage cancellation when the voltage of the input signal is above the predefined voltage.

8. The cascaded charge pump of claim 7, wherein the gate of the first transistor is coupled with the second terminal of the second transistor.

9. The cascaded charge pump of claim 8, wherein the gate of the second transistor is coupled with the input port.

10. The cascaded charge pump of claim 7, further including an overvoltage clamp coupled between the gate of the main transistor and the input port.

11. The cascaded charge pump of claim 7, wherein the threshold voltage cancellation circuit includes an enable port to enable or disable removal of the threshold voltage cancellation when the voltage of the input signal is above the predefined voltage.

12. The cascaded charge pump of claim 11, wherein at least one of the plurality of charge pumps is configured to have the removal of the threshold voltage cancellation disabled.

13. The cascaded charge pump of claim 7, wherein at least one of the plurality of charge pumps is configured to have the threshold voltage cancellation circuit disabled.

14. An integrated circuit including the cascaded charge pump of claim 7.

* * * * *